Figure 1:
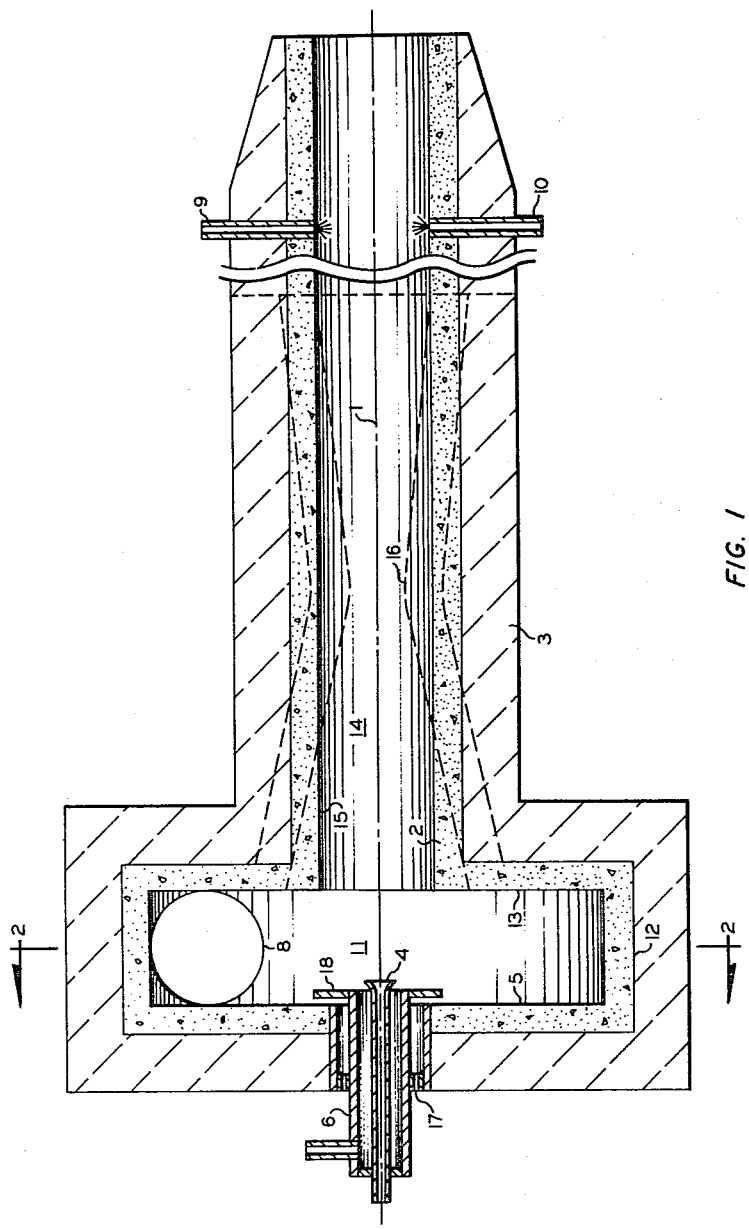

United States Patent [19]

Cheng

[11] 4,294,814
[45] Oct. 13, 1981

[54] CARBON BLACK PROCESS AND REACTOR

[75] Inventor: Paul J. Cheng, Bartlesville, Okla.

[73] Assignee: Phillips Petroleum Company, Bartlesville, Okla.

[21] Appl. No.: 134,856

[22] Filed: Mar. 28, 1980

Related U.S. Application Data

[63] Continuation-in-part of Ser. No. 895,430, Apr. 12, 1978, Pat. No. 4,224,284, which is a continuation-in-part of Ser. No. 498,776, Aug. 19, 1974, abandoned.

[51] Int. Cl.³ ............................................. C09C 1/50
[52] U.S. Cl. .................................... 423/457; 422/150; 422/156; 423/450; 423/456

[58] Field of Search ............... 423/456, 450, 455, 457; 422/150, 156

[56] References Cited

U.S. PATENT DOCUMENTS 3,431,075  3/1969  Gunnell .............................. 423/456
3,563,706  2/1971  Gunnell .............................. 423/456

Primary Examiner—Edward J. Meros

[57] ABSTRACT

Stoichiometric combustion conditions are provided at a location remote from reactor walls in a carbon black process and apparatus by injecting radially inwardly hot combustion gases of a complementary composition with respect to the hot combustion gases introduced tangentially into the reactor.

9 Claims, 9 Drawing Figures

CARBON BLACK PROCESS AND REACTOR

This application is a continuation-in-part of my copending application Ser. No. 895,430, filed Apr. 12, 1978, now U.S. Pat. No. 4,224,284, which is in turn a continuation-in-part of application Ser. No. 498,776, filed Aug. 19, 1974, now abandoned.

This invention relates to the manufacture of carbon black.

More particularly, the invention relates to the production of carbon black in a tubular reactor into which hydrocarbon feed (make oil) is axially introduced, into which hot combustion gases are tangentially introduced forming a vortex around said hydrocarbon feed stream and from which hydrocarbon bearing smoke is withdrawn.

BACKGROUND OF THE INVENTION

It is well known in the art to make carbon black by pyrolytical decomposition of a hydrocarbon, e.g., an oil. In one embodiment of such processes which has proven especially successful, a tubular reactor is employed having a longitudinal axis. The hydrocarbon feed is introduced into such a reactor along the longitudinal axis, hot combustion gases are tangentially fed spinning around the hydrocarbon feed stream and the hydrocarbon bearing smoke is recovered at the downstream end of such a reactor.

One of the problems which still is worked upon is the structure of the carbon black. For many applications it is desirable to produce a carbon black with high structure, i.e., a carbon black wherein a large number of nodules are fused together to form one aggregate. Such a high structure carbon black is readily processable, especially when such carbon black is employed as a filler in rubber. The high structure carbon black in addition has a high oil absorption which is advantageous for some purposes. Whereas the known process outlined above produces a carbon black with good structure, there still exists a demand for an increase of the structure of the carbon black.

The Invention

It is thus one object of the invention to provide a process for the production of carbon black.

Another object of this invention is to provide a process for the producing of carbon black having increased structure.

A further object of this invention is to provide a reactor for the production of carbon black.

Still another object of this invention is to provide a longitudinal carbon black reactor having axial hydrocarbon feed and tangential hot combustion gas feed for the production of high structure carbon black.

Other objects, aspects, advantages and embodiments of this invention will become apparent to those skilled in the art from the following detailed description of the invention together with the appended claims and the drawings of which:

FIGS. 1, 3, 5 and 7 are axial cross sections through reactors in accordance with this invention.

FIGS. 2, 4, 6 and 8 are cross sections through the reactors shown in FIGS. 1, 3, 5 and 7, respectively, said cross sections being taken along the lines 2-2, 4-4, 6-6 and 8-8, respectively, in said FIGURES.

Figure 9:
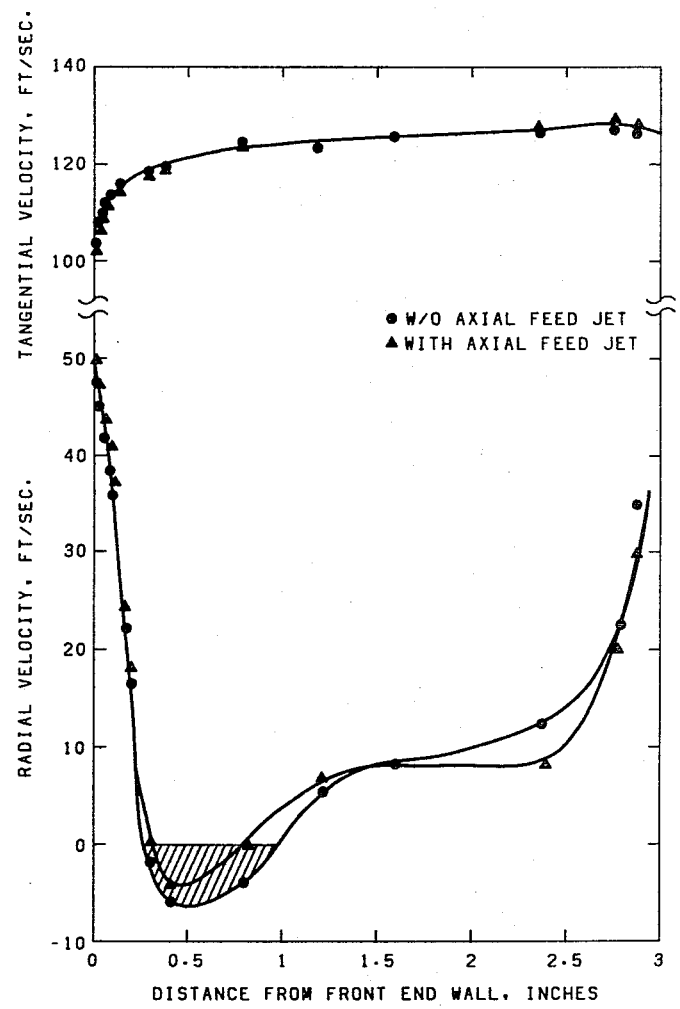

FIG. 9 shows a graph of radial and tangential velocities as a function of the distance from the upstream confining wall.

In accordance with this invention, I have now found that a high structure carbon black can be produced by axially introducing a first stream of hydrocarbon feed into a longitudinal reactor, by circumferentially or tangentially introducing a second stream of hot combustion gases into the reactor so as to form a vortex of hot combustion gases around the first stream of hydrocarbon feed and by introducing a third stream of gas radially into the reactor.

More specifically, I have found that if said vortex of hot combustion gases is created proximate to a confining wall the interior of which extends radially outwardly upstream of said vortex the effect of an undesired boundary layer flow along said wall on the carbon black structure can be avoided or at least be markedly reduced if said third stream of hot combustion gases is injected in essentially radial and outward direction close to said confining wall into the reactor. The boundary layer flow just mentioned is not a purely radially inwardly directed flow. This boundary layer flow rather has a certain tangential or circumferential component resulting from the spinning movement of the gases in the vortex. Therefore, in order to counteract against the boundary layer flow which has been found to be undesirable in accordance with this invention, the radially outwardly directed flow of a gas can be directed in the opposite sense of the boundary layer flow. That means that the additional stream of gas can be directed along said upstream confining wall with a circumferential component in addition to the radially outwardly directed component close to the confining wall, which additional component has the opposite sense to the circumferential component of the boundary layer flow or vortex. Since the magnitude of this additional circumferential component for ideal operation depends upon the location of the introduction In accordance with a further embodiment of this invention, there is provided a process for the production of carbon black wherein a first stream of hydrocarbon feed is axially introduced into a longitudinal, tubular reactor along its longitudinal axis, a second stream of hot combustion gases resulting from combustion of a stream comprising fuel and free oxygen in a nonstoichiometric composition is introduced circumferentially into a precombustion section of said reactor to form a vortex around said first stream, a third stream of hot combustion gases resulting from combustion of a stream in a nonstoichiometric composition of fuel and oxygen is introduced essentially radially inwardly toward the hydrocarbon feed from at least two outlets located at a radial distance from said hydrocarbon feed stream and located at an axial distance from said confining wall and located circumferentially around the axis of the reactor at such locations that the portions of the third stream stabilize themselves and flow into the feed stream but not radially out of it again, said third stream is mixed with a portion of the gas of said second stream in said precombustion section of said reactor such as to form a gas mixture having stoichiometric composition of fuel and oxygen, and said gas mixture is introduced into said first stream of hydrocarbon feed.

In this second embodiment, a very high temperature is created by the stoichiometric composition of the hot combustion gas right inside of the hydrocarbon feed without contact to the walls. This is believed to create a high structure carbon black. The stabilization mentioned is in the simplest and preferred case brought out by employing an even number of diametrically opposite outlets symmetrically arranged for creating a corresponding number of identical portions of said third radially inwardly directed stream.

In accordance with the first variation of the first embodiment of this invention, there is provided a carbon black process wherein the first stream of hydrocarbon is axially fed into a longitudinal reactor comprising a precombustion section having an upstream wall arranged orthogonally to the axis of the reactor connected therewith a cylindrical wall and connected to said cylindrical wall a downstream wall arranged orthogonally to the axis of the reactor in an axial communication and alignment with said precombustion section a reaction section formed as a venturi, wherein a second stream of hot combustion gases is tangentially fed into said precombustion section of the reactor so as to create a vortex of hot combustion gases around said first stream, wherein a third stream of hot combustion gases is fed essentially radially outwardly into the reactor close to the interior of said upstream wall and wherein a fourth stream of hydrocarbon feed is introduced into the reactor at the throat of said venturi-shaped reaction section or downstream thereof.

In accordance with a second variation of the first embodiment of this invention, there is provided a carbon black process wherein up to about one-third or less of the combustion gases are fed radially outwardly closely to the upstream confining wall and two-thirds or more of the hot combustion gases are fed tangentially into the reactor and wherein the reactor either comprises a large precombustion section and a smaller, cylindrically shaped or venturi-shaped reaction section or consists essentially of one large cylindrical chamber.

In accordance with this invention, there is further provided a carbon black reactor for carrying out the process of this invention. A carbon black reactor in accordance with this invention comprises a housing with tubular-shaped interior made out of heat-resistant material, first conduit means for the axial introduction of hydrocarbon feed into said housing, second conduit means for the tangential introduction of combustion gases into said housing, third conduit means for radial introduction of a gas into said housing, and means to withdraw the carbon black bearing smoke from the downstream end of the reactor.

In one embodiment of the reactor in accordance with this invention, the reactor comprises an upstream confining wall arranged essentially orthogonally to the longitudinal axis, said first conduit means being arranged extending axially through said wall, said upstream confining wall being attached to a cylindrical portion of the housing, said second conduit means being arranged tangentially extending through said cylindrical portion of said housing close to said upstream confining wall, said third conduit means extending axially through said confining wall and comprising deflecting means to deflect the third stream into radially outward direction. In order to effectively counteract the boundary layer flow described above, the preferred reactor in accordance with this invention is equipped with said third conduit means being arranged so as to have their orifices or outlets facing radially outwardly, i.e., away from the longitudinal axis, and close to said upstream confining wall.

The reactor in accordance with this first embodiment of the invention can also comprise a large precombustion chamber and a smaller reaction section shaped internally either cylindrically or like a venturi. The reactor can also comprise a combined large size precombustion and reaction cylinder.

In the preferred variation of the second embodiment of this invention the radially inwardly directed hot combustion gas stream having a composition which can be described as nonstoichiometric but complementary nonstoichiometric with respect to the nonstoichiometric hot combustion gas stream tangentially introduced, is introduced into the reactor at a location which is at a significant distance from any of the reactor confining walls. Specifically, the radially inwardly directed gas stream is injected into the reactor at a location relatively close to the hydrocarbon feed stream axially introduced into the reactor. Thus, this radially inwardly introduced hot combustion gas stream will first mix with the other hot combustion gases that have been tangentially introduced into the reactor forming a stoichiometric and very hot combustion gas mixture with then will contact the hydrocarbon feedstream. The radially inwardly introduced hot combustion gas stream therefore will never contact a reactor wall prior to its admixture with the other hot combustion gases and with the hydrocarbon feedstream.

Typically, the nonstoichiometric hot combustion gases are radially inwardly introduced into the carbon black reactor at a distance from the reactor axis in radial direction which is less than ½ of the diameter of the carbon black reactor at that position and at a distance axially downstream from the upstream confining wall of at least 1 inch and downstream of the orifice of the reactor releasing the hydrocarbon feedstream in axial direction into the reactor.

In a further embodiment of the reactor of this invention, the housing of the reactor comprises an upstream confining wall arranged essentially orthogonally to the longitudinal axis, the first conduit means are arranged axially extending through said upstream confining wall, the confining wall is attached to a cylindrical portion of the housing, the second conduit means are arranged tangentially extending through said cylindrical portion of the housing close to said confining wall, the third conduit means comprise a plurality of individual tubes extending axially through said confining wall and being bent by 90 degrees toward the axis of the reactor to form orifices or outlets facing radially inwardly and being located at a radial distance from the hydrocarbon feed stream and at an axial distance from the upstream confining wall. This embodiment of the reactor in accordance with this invention serves to introduce a radial stream of hot combustion gases into the hydrocarbon feed stream. The third conduit means are preferably connected to a source of combustion gases resulting from combustion of a stream comprising oxygen and fuel in a fuel-rich composition, i.e., these source means furnish a gas mixture comprising more fuel than the quantity which can be burned by the oxygen present. Correspondingly, the second conduit means are connected to a source of combustion gases resulting from combustion of a stream comprising oxygen and fuel in an oxygen-rich composition, i.e., in the gas mixture there is more oxygen present than stoichiometrically necessary for the combustion of the fuel. By the arrangement of the outlets just described a gas mixture is introduced into the hydrocarbon feed stream having a stoichiometric composition of fuel and oxygen thus creating a very high temperature in the hydrocarbon feed stream without contact to the reactor walls.

The invention will be more fully understood from the following detailed description of the drawings and the examples of preferred embodiments of this invention.

In FIGS. 1 to 8, carbon black reactors are shown in two sectional views for each reactor. Many details have been omitted and only the essential portions of the reactors are shown. Each of these reactors has a tubular-shaped interior with a longitudinal axis 1. The interior of the reactor comprises a refractory lining 2 which can stand very high temperatures. The lining 2 can, e.g., consist of ceramic material. The ceramic lining 2 is encased by an insulating shell 3. Usually, a metal shell (not shown) covers the entire body of the reactor. This shell can consist of stainless steel or any other metal conventionally used.

An inlet conduit 4 for the hydrocarbon feed which may or may not have an outlet nozzle is positioned in the upstream end wall 5. Surrounding the inlet conduit 4 a larger conduit 6 is arranged in the upstream end wall. Through this conduit 6 a small amount of air, the so-called jacket air, is passed.

Near the upstream end wall 5 two tangential inlets 7 and 8 are arranged. Through these inlets hot combustion gases can be tangentially fed via conduits 71 and 81 into the reactor. The direction of feed is such that the combustion gases introduced into the reactor will make a spinning movement around the hydrocarbon feed stream in the same sense creating a vortex of hot combustion gases surrounding the hydrocarbon feed stream.

At a location downstream of the tangential inlets, quench lines 9 and 10 are located. Through these lines, e.g., water or other coolant is introduced into the reactor in order to quench the hot smoke and stop the carbon black formation or to modify the carbon black. At the downstream end of the reactor the carbon black bearing smoke is withdrawn. Usually this smoke is passed through a separating unit, e.g., a filter, wherein the carbon black is separated from the gas and recovered.

Figure 2:
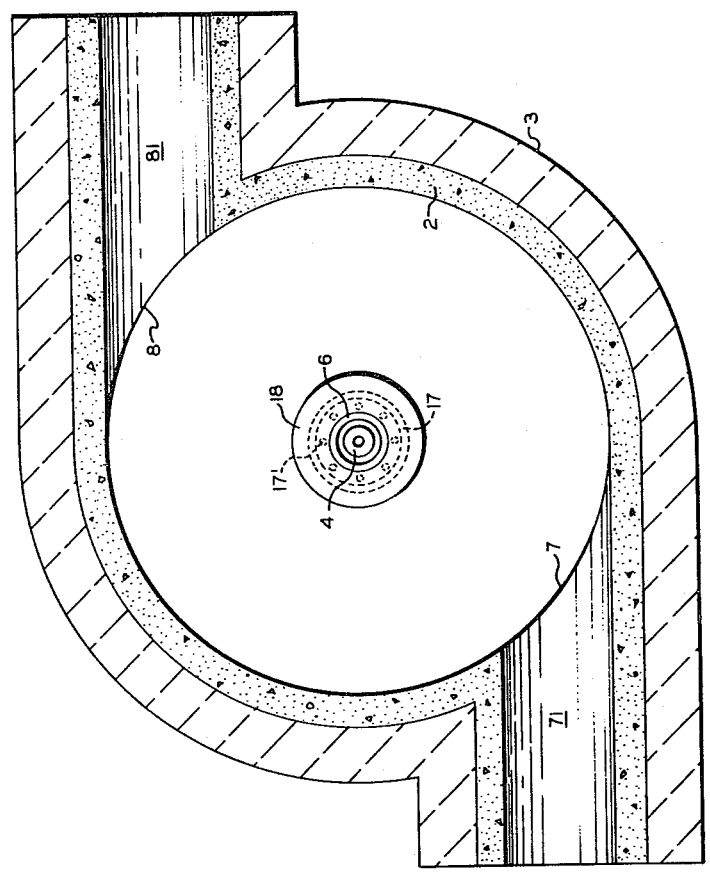

Referring now specifically to the reactor shown in FIGS. 1 and 2, the end wall 5 constitutes the upstream confining wall 5 of a precombustion section 11 of the reactor. This precombustion section is further defined by a cylindrical wall 12 and a downstream confining wall 13. Both confining walls 5 and 13 are arranged essentially orthogonally to the longitudinal axis 1 of the reactor. The diameter of the inlets 7 and 8 is about the same as the axial length of the combustion section 11 or as the confining interior length of the cylindrical wall 12. However, the diameters of inlets 7 and 8 can be less than the axial length of section 11.

In axial alignment and open communication with the precombustion section 11, a reaction section 14 with smaller internal diameter than the combustion section is provided for. In this section the feed stream and the hot combustion gases mix and the hydrocarbon feed is further pyrolytically decomposed to form carbon black. This reaction section 14 can be confined by a wall 15 with a cylindrical interior as shown in straight lines in FIG. 1 or the section can be confined by a venturi-shaped wall 16 as shown in dotted lines in FIG. 1. Generally, a venturi formed out of two frustoconical portions constitutes a satisfying reaction section. However, a cylindrically choked reaction section could also be employed.

In accordance with this invention, there are provided means to introduce combustion gases close to the interior of the upstream confining wall 5 of the combustion section 11 in essentially radially outward direction. In the case of the reactor shown in FIGS. 1 and 2, these means comprise an annulus 17 arranged symmetrically around the longitudinal axis 1 of the reactor in the upstream confining wall 5 near the central conduit 6. An annularly shaped baffle plate 18 is attached to conduit 6. This baffle plate 18 reaches sufficiently beyond (radially outwardly) the outlet of the annulus 17 so as to deflect the combustion gases introduced through the annulus 17 from axial into essentially radial direction.

The combustion gases introduced through the annulus 17 moving radially outwardly constitute the counterstream to the boundary layer flow observed in this kind of reactor. It has been found that without these means for the introduction of hot combustion gases radially outwardly close to said upstream confining wall a stream of combustion gases from inlets 7 and 8 would flow radially inwardly as a boundary layer at the upstream confining wall in a thickness of about $\frac{1}{2}''$ 1" and cause a premature mixing of said gases with the hydrocarbon feed. This is believed to be detrimental to the property of high structure of the carbon black. By means of this radially outward counterflow the premature mixing is avoided and the carbon black will have a higher structure.

Figure 3:
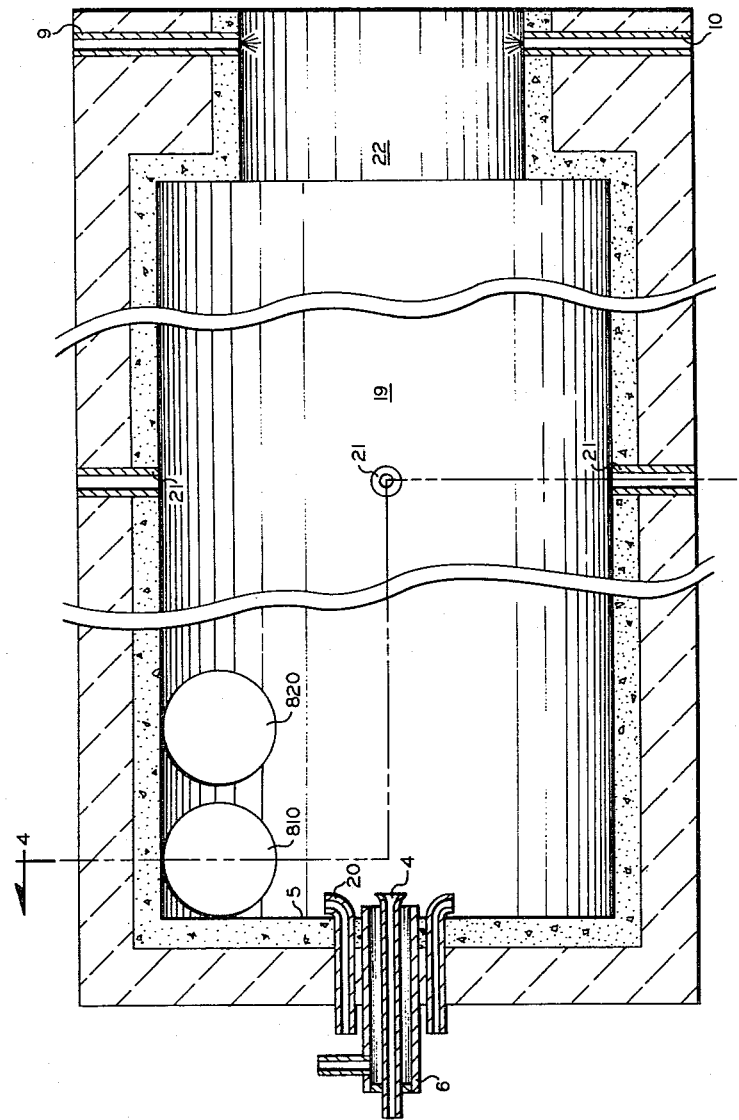
Figure 4:
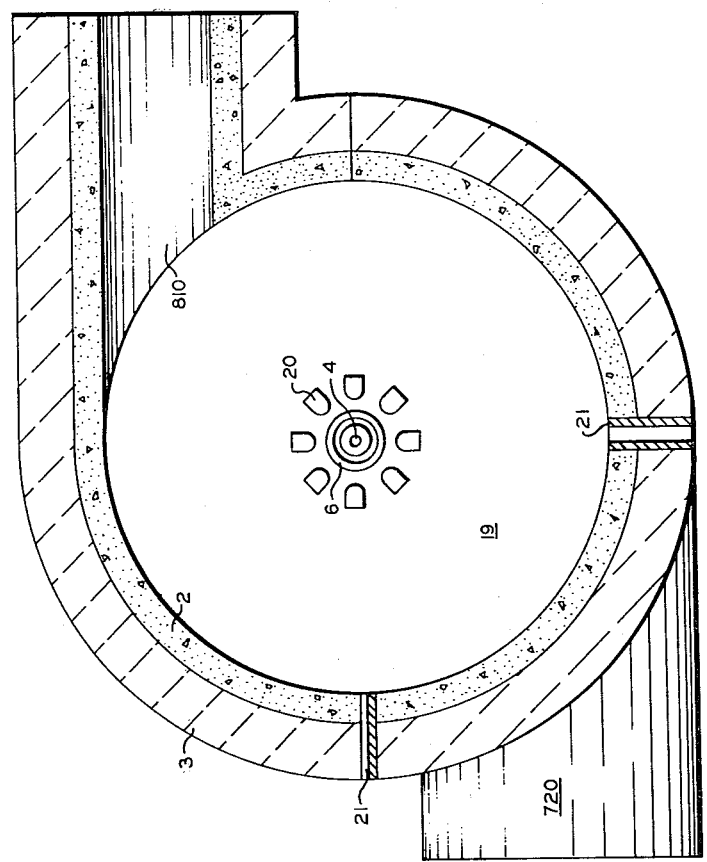

A further embodiment of a carbon black reactor in accordance with this invention is shown in FIGS. 3 and 4. This reactor generally serves for the production of large carbon black particles and its longitudinal axis is generally arranged in vertical direction. A large cylindrical chamber 19 is provided for both combustion and reaction. Instead of one pair of tangential inlets 7, 8 as in the reactors shown in FIGS. 1 and 2, two such pairs 710, 810 and 720 (not shown), 820 are provided for tangential introduction of hot combustion gases. The axial feed of "make oil" is the same as for the reactor shown in FIGS. 1 and 2. Instead of the annulus 17 and baffle plate 18 in FIG. 1, the radial counterstream flow to the upstream wall is created in this reactor by eight tubes 20, all outlets of which are arranged in the same radial distance from the longitudinal axis and symmetrically around said longitudinal axis of the reactor. The ends of the tubes 20 extending into the reactor are bent about 90° so that their discharge ends shown in basically radially outward direction. Through four radial inlets 21 secondary air can be blown into the reactor.

Downstream of the secondary air inlets 21, the reactor 19 is connected to a section 22 with reduced diameter. In this section quench lines 9 and 10 are arranged to quench the hot carbon black bearing smoke, e.g., by spraying water into the reactor.

Figure 5:
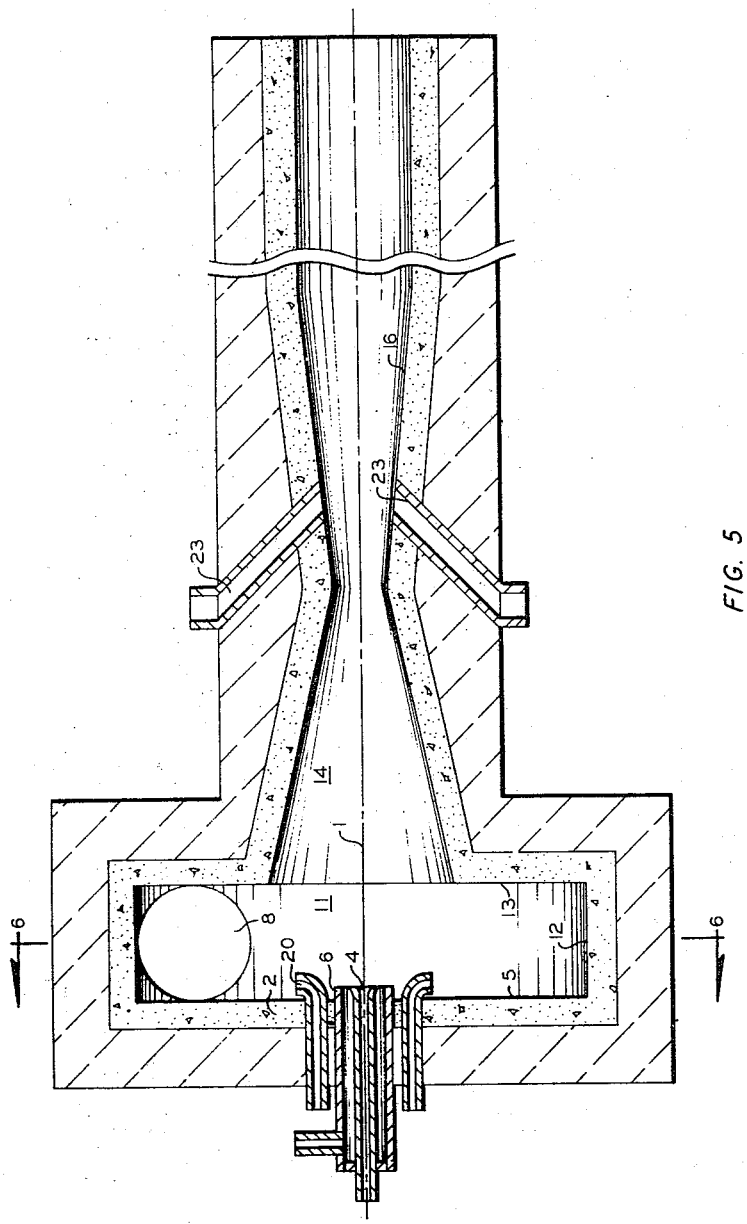
Figure 6:
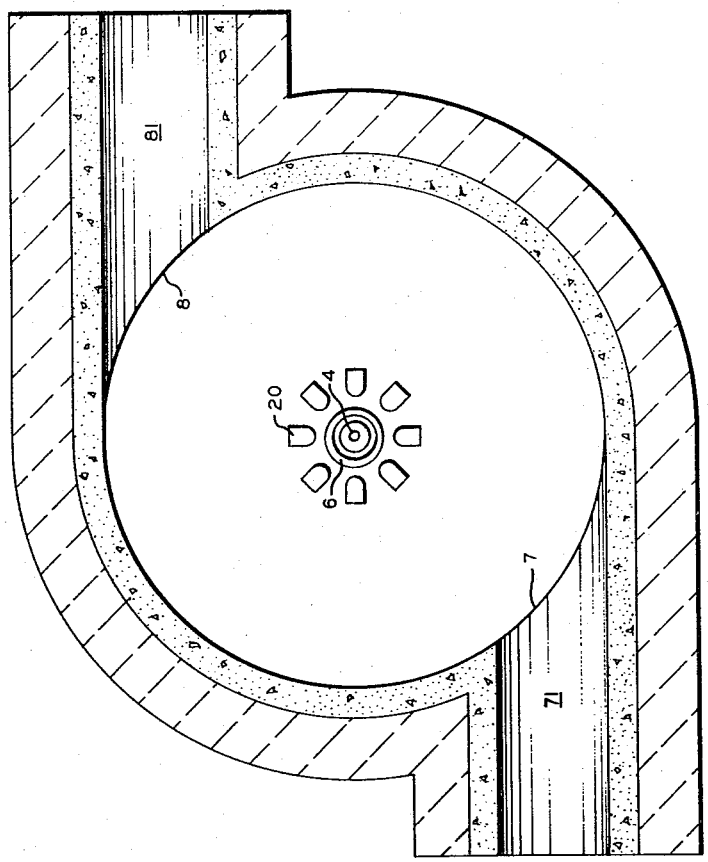

Another type of reactor is shown in FIGS. 5 and 6. The reactor comprises a wide combustion section 11 and in axial alignment and open communication therewith a narrower reaction section 14 having a venturi-shaped wall 16. In this reactor only a minor portion of make oil, namely up to about 25 percent of the total make oil, is fed axially into the reactor through line 4. The rest of the make oil is fed through at least two conduits 23, the outlets or orifices of which are arranged so as to direct the major portion of the make oil in radially inward and axially downstream direction toward the axis of the reactor. The inlets are so arranged as to avoid radial stream of make oil exactly at the longitudinal axis of the reactor. Preferably, an arrangement is chosen which is symmetrical to the longitudinal reactor axis, e.g., by using two or four identical opposing pairs of conduits 23, the orifices or outlets of which have the same distance from and direction toward the longitudinal axis and being disposed equidistantly circumferentially around the axis of the reactor. The axial location of the orifices is at the throat of the venturi or up to two diameters of the throat downstream thereof.

About two-thirds or more of the toal hot combustion gases are introduced tangentially into the combustion section through conduits 71 and 81. A smaller amount of hot combustion gases, namely up to one-third of the total amount of hot combustion gases, is introduced radially outwardly close to the upstream confining wall 5 of the combustion chamber 11 through eight tubes 20, the orifices or outlets of which, being located inside of the reactor, point radially outwardly close to said upstream confining walls.

Figure 7:
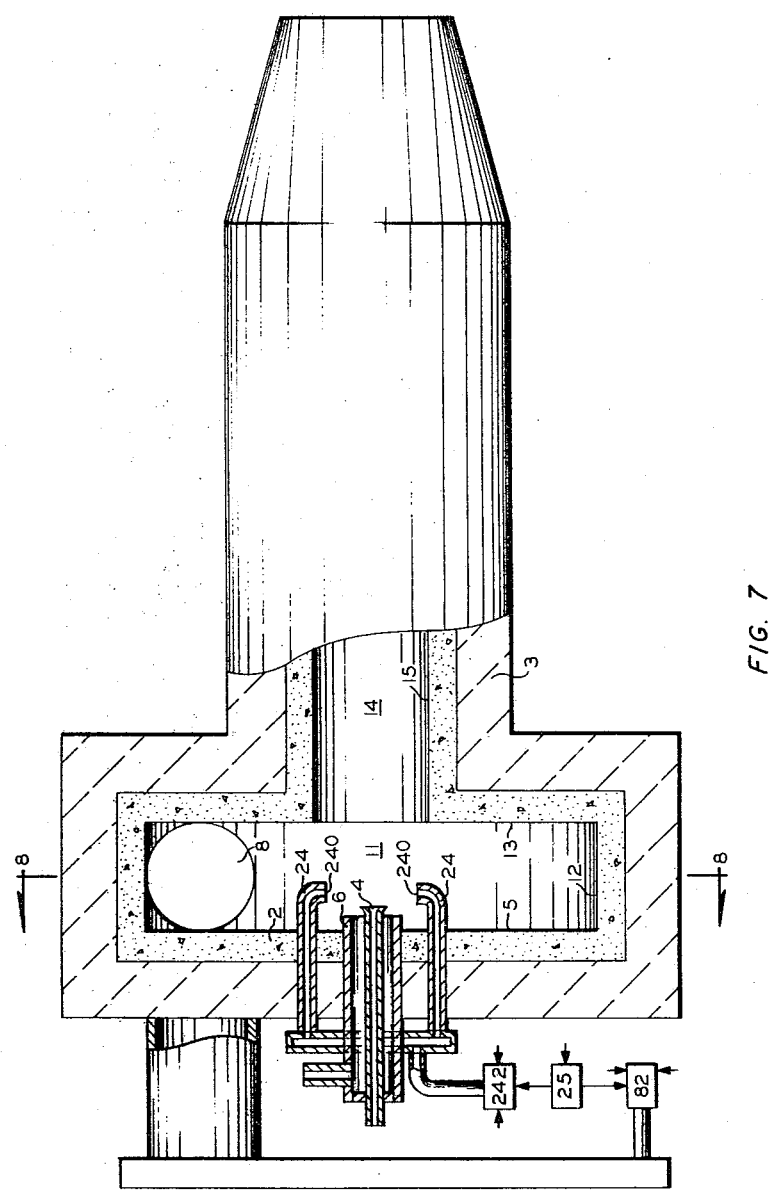
Figure 8:
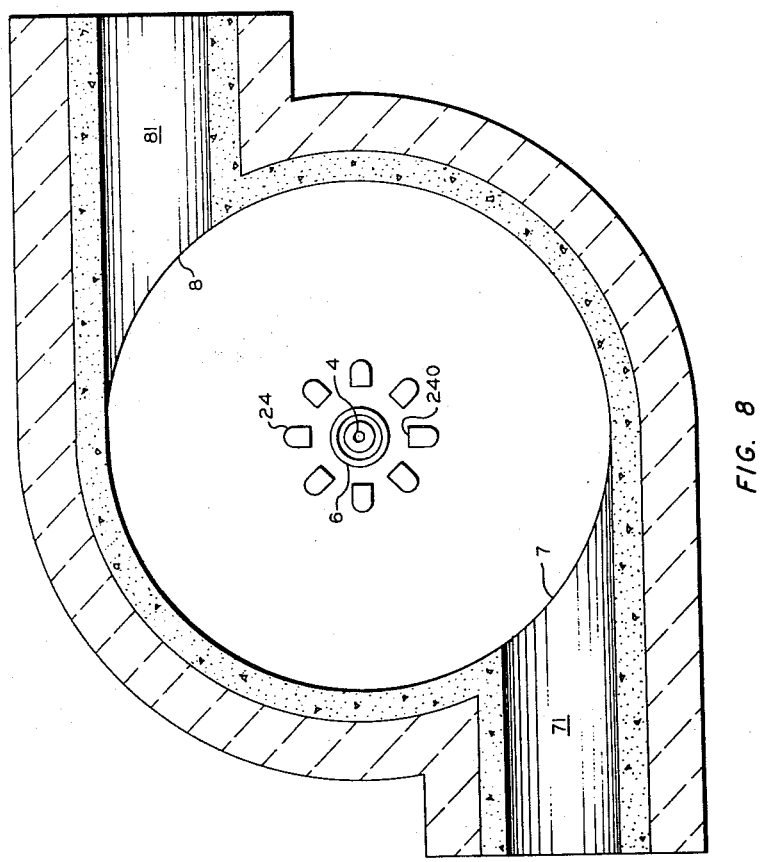

A reactor with radially inward flow of hot combustion gases is shown in FIGS. 7 and 8. The structure of this reactor is basically the same as in the case of the reactor shown in FIGS. 1 and 2. The main difference resides in the additional radially inwardly directed combustion gas stream.

The reactor in accordance with FIGS. 7 and 8 has eight conduits 24 reaching axially through the upstream end wall and turning in an arc of 90° toward the axis so that they can create a radially inwardly directed stream of gas (not a radially outwardly directed stream as in the previous examples). The orifices 240 of these conduits 24 are located at a distance both axially from the upstream end wall (not close to said wall as in the previous examples) and at a distance rdially from the hydrocarbon feed stream created by the nozzle 4.

The conduits 24 are all connected to a source 242 of combustion gases which introduces the combustion products of a mixture of air and fuel with less air than stoichiometrically necessary for the combustion of all the fuel via lines 24 into the reactor. The conduits 81 and 71 for the tangential introduction of hot combustion gases are connected to a source 82 of combustion gases which introduces the combustion products of a mixture of air and fuel with more air than stoichiometrically necessary for the combustion fo the fuel via lines 71 and 81 into the reactor.

During the operation of the reactor the hot combustion gas stream which is fuel rich will mix with a portion of the surrounding hot combustion gases which are oxygen rich. The forming gas mixture enters axially into the hydrocarbon feed stream.

Control means 25 is provided to control the quantity and/or composition of the combustion gas introduced tangentially and radially into the reactor so that a stoichiometric combustion gas-mixture is introduced into and mixed with the hydrocarbon feed stream. This stoichiometric mixture is at a very high temperature and will rapidly pyrolytically decompose the make oil. On the other hand, the mixture does not come into contact with any wall portions so that the high temperatures of the gas mixture has no detrimental effect on the reactor walls.

FIG. 9 of the attached drawing further illustrates the boundary layer flow discovered and eliminated in accordance with this invention. The lower portion of FIG. 9 shows the radial velocity of gases measured in a reactor having a shape very similar to that of FIG. 1. Air was introduced tangentially through inlets 8, nitrogen as the axial "feed". The axial length of the precombustion section 11 of this reactor was three inches. The diameter of section 11 has 11 inches. The radial velocity of the gas flowing into this reactor was measured as a function of the distance from the wall 5 (FIG. 1). The radial velocity in foot/second at 1.75 inches from the center is shown as a function of the distance from this front end wall. The measurements have been carried out for two different cases, one with an axial feed jet and the second case without an axial feed jet. The two respective curves are shown in the lower portion of this graph. This figure clearly shows a very strong radial velocity of gases within a small boundary zone which in the present case is less than about a quarter of an inch. The graphs also show that this boundary layer flow is independent or essentially independent of whether there is an axial feedstream present or not.

Corresponding to this axial boundary layer flow, the tangential velocity close to the upstream confining wall 5 is reduced. This is shown in the upper portion of the figure again for a case with and for a case without axial feed jet. The reduced tangential velocity in the boundary layer area, i.e. between zero and ¼" distance from the upstream wall 5 can clearly be seen.

The results indicate that it is the boundary layer flow that causes a significant portion of the pressure drop across the reactor. Conversely, the destruction of this boundary layer flow results in the significant reduction of the pressure drop shown in the examples above. Therefore, it is an important feature of this invention that the radially outwardly directed flow counteracting the boundary layer flow is close to the upstream confining wall. For commercial size carbon black reactors, the boundary area in whic this boundary layer flow occurs reaches up to one-half to one inch in axial direction from the upstream wall 5. These commercial size carbon black reactors have a zone 11 (FIG. 1) having an axial length of about 12 inches, a diameter of about 24–39 inches.

The following examples illustrate the operation of carbon black reactors in accordance with this invention. For the first example the reactor basically corresponds to the one shown in FIG. 1, however, instead of the annulus 17 and the baffle plate 18, eight tubes 17' for radially outward introduction of hot combustion gases are provided for, similar to those shown in FIGS. 5 and 6, for instance.

EXAMPLE I

A reactor is used in this example having the following internal dimensions:

TABLE 1

| | |
|---|---|
| Axial length of the precombustion chamber | 12 inches |
| Diameter of the precombustion chamber | 37 inches |
| Diameter of the tangential orifices | 12 inches |
| Radial distance of the radial orifices from the longitudinal axis | 4 inches |
| Diameter of the radial orifices | 1.5 inches |

To produce carbon black with this reactor, Gulf oil having a Bureau of Mines Correlation Index of 120 and an average boiling point of about 800° F. is axially introduced into the reactor through conduit 4. Hot combustion gases consisting of the hot combustion products produced from burning a mixture of air and natural gas is introduced through inlets 7 and 8 into the reactor. Through the radial outlets hot combustion products produced from burning a mixture of air and natural gas is introduced at a jet speed of about 500 feet per second at the outlets. The resulting carbon black will have a higher structure and the pressure drop in the reactor will be reduced as compared to the corresponding run employing no radial counterflow. The quantities of oil and gas introduced are shown in the following Table 2. In the following the abbreviation gph is used to indicate gallons per hour, the abbreviation of MSCFH is used to indicate 1,000 standard cubic feet per hour.

TABLE 2

| | |
|---|---|
| Oil axially through upstream end wall | 290 gph |
| Tangential air | 200 MSCFH |
| Tangential Natural gas (1000 Btu/SCF) | 12 MSCFH |
| Radial air | 25 MSCFH |
| Radial Natural gas | 3 MSCFH |

It has been found that the creation of a vortex in the precombustion chamber of a reactor causes a considerable pressure drop in the carbon black reactor. By the radially outwardly directed counterflow close to the upstream confining wall of the precombustion section wherein the vortex surrounding the hydrocarbon feed is created, the pressure drop can be considerably reduced. This measure in turn can reduce pumping and operation costs. To show this pressure drop and the influence of the radially outwardly directed flow the following example is given.

EXAMPLE II

In this example a reactor model was employed the dimensions of which are shown in the following:

TABLE 3

| | |
|---|---|
| Axial length of the precombustion chamber | 3 inches |
| Diameter of the precombustion chamber | 11 inches |
| Diameter of the tangential orifices | 3 inches |
| Radial distance of the radial outlets from the longitudinal axis | 1.5 inches |
| Diameter of the cylindrical reaction section | 3 inches |

This reactor was gometrically similar to the larger reactor described in Example I and corresponds basically to the reactor shown in FIG. 1 in solid lines with the exception that instead of the annulus 17 and the baffle plate 18, eight tubes 17' with radially outwardly directed orifices have been employed to introduce the additional hot combustion gas.

Into the reactor described nitrogen has been fed axially. Through the hot combustion gas inlets air was introduced tangentially and radially. The respective quantities of the gases introduced are shown in the following table. Six runs have been carried out and the runs to be compared are the runs 1 and 2, 3 and 4, 5 and 6, respectively. The overall quantity of air and nitrogen in these pairs of runs has been reduced from runs 1-2 to runs 5-6. The results with respect to the pressure drop are also shown in the following table. The upstream pressure was measured upstream of the tangential inlet 7 in the respective tunnel conduit 71. The downstream pressure was measured about 4 feet downstream of the combustion section. In the following table the quantities of air or nitrogen are given in scfh (standard cubic feet per hour) and the pressure difference is shown in inches of mercury.

TABLE 4

| Run No. | Air through Tangential Inlets 28 | Air through Radial Inlets 6 | Nitrogen Feed Through Tube 4 | $\Delta P = P_1 - P_2$ | Pressure Drop Reduction |
|---|---|---|---|---|---|
| 1 | 12,700 | 0 | 810 | 0.48 | |
| 2 | 10,700 | 2,000 | 810 | 0.30 | 37% |
| 3 | 10,700 | 0 | 680 | 0.36 | |
| 4 | 8,700 | 2,000 | 680 | 0.15 | 58% |
| 5 | 8,700 | 0 | 560 | 0.23 | |
| 6 | 6,700 | 2,000 | 560 | 0.08 | 65% |

The data of this Table 4 show that by radially outwardly introducing gas close to the upstream confining wall of a precombustion section the pressure drop in the carbon black reactor having axial hydrocarbon feed and tangential hot combustion gas feed can be considerably reduced. For a large reactor with a reaction section of 12 inch diameter described above, the known pressure drop of 2.2 psi can be reduced to 1.4 psi by splitting a total 225 MSCFH of combustion gases into 190 MSCFH tangentially and 35 MSCFH radially fed combustion gases. This decrease of about 35 percent of the pressure drop makes possible a higher throughput of make oil and hot combustion gases with otherwise unchanged equipment; this results in an increase of carbon black production of about 20 to about 25 percent.

EXAMPLE III

In the following example the effect of the radial counterflow on a venturi-shaped reactor will be shown. This reactor is basically of the same type as the cylindrical reactor described. The main difference between the two types of reactors is that the reaction section of this reactor is venturi-shaped as shown in FIG. 1 in dotted lines. The dimensions of the reactor are shown in the following Table 5.

TABLE 5

| | |
|---|---|
| Axial length of the precombustion chamber | 3 inches |
| Diameter of the precombustion chamber | 11 inches |
| Diameter of the tangential orifices | 3 inches |
| Radial distance of the radial orifices from the axis | 1.5 inches |
| Diameter of the radial orifices | ¼ inch |
| Upstream diameter of the venturi reaction section | 3 inches |
| Throat diameter of the venturi reaction section | 1.4 inches |
| Downstream diameter of the venturi reaction section | 3 inches |
| Angle of the converging portion of the venturi reaction section to the longitudinal axis | 15° |
| Angle of the diverging portion of the venturi reaction section to the longitudinal axis | 8° |

Into the reactor thus described air was introduced tangentially and nitrogen was introduced axially. Two runs were carried out, one with radial introduction of a portion of the air and the other with all the air being introduced tangentially. The upstream pressure $P_1$ was measured in the conduit 81 close to the tangential orifice. The downstream pressure $P_2$ was measured about 15 reaction section diameters downstream of the upstream end wall of the reactor. The volumes employed and the pressure drops measured are shown in the following Table 6.

TABLE 6

| Run No. | 7 | 8 |
|---|---|---|

TABLE 6-continued

| | | |
|---|---|---|
| Axial nitrogen (scfh) | 810 | 810 |
| Tangential air (scfh) | 12,700 | 10,700 |
| Radial air (scfh) | — | 2,000 |
| Pressure drop = $P_1 - P_2$ (in. Hg) | 1.39 | 0.84 |

The data of Table 6 show that the radial introduction of gas in this example lowers the pressure drop of a venturi-shaped reactor by about 40 percent. Therefore, a considerably higher amount of oil per hour can be converted into carbon black under the same conditions of initial pressure, pump sizes, reactor dimensions, etc., as compared to the same reactor operated without radial counterflow.

EXAMPLE IV

In the following example carbon black was made in a carbon black reactor having a venturi-shaped reaction section. The oil used for hydrocarbon feed was Ponca oil having a Bureau of Mines Correlation Index of 124. The gas employed as the fuel for the hot combustion gases was propane. The dimensions of the reactor employed are shown in the following Table 7.

TABLE 7

| | |
|---|---|
| Axial length of the precombustion chamber | 4 inches |
| Diameter of the precombustion chamber | 10 inches |
| Diameter of the tangential orifices | 3 inches |
| Radius of baffle plate from the axis | 0.75 inch |
| Distance of baffle plate from upstream end wall | ⅜ inch |
| Upstream diameter of the venturi reaction section | 3 inches |
| Throat diameter of the venturi reaction section | 1.6 inches |
| Downstream diameter of the venturi reaction section | 3 inches |
| Angle of the converging portion (upstream frustoconus) to the axis of the reactor | 15° |
| Angle of the diverging portion (downstream frustoconus) to the axis of the reactor | 8° |

In this reactor two runs were carried out. In one run no combustion gases were radially fed into the reactor, however, jacket air surrounding the oil feed line was introduced to protect the oil feed line. In the next run the jacket air could be avoided since in radially outward direction combustion gases were blown into the reactor preventing the detrimental effect of the boundary layer flow on the fed oil line. The quantities of oil and gas fed are shown in the following Table 8.

TABLE 8

| | Control Without Radial Counterflow | With Radial Counterflow |
|---|---|---|
| Oil fed axially through the upstream end wall (lb/hr) | 84.3 | 96.4 |
| Tangential air (scfh) | 9,000 | 9,000 |
| Tangential gas ($C_3H_8$ scfh) | 255.6 | 255.6 |
| Jacket air (scfh) | 262 | — |
| Radial air (scfh) | — | 1,000 |
| Radial gas ($C_3H_8$ scfh) | — | 42 |

The properties of the carbon black made as well as the pressure drop measured are shown in the following Table 9.

TABLE 9

| | Control Without Radial Counterflow | With Radial Counterflow |
|---|---|---|
| Surface area of the carbon black measured by nitrogen absorption ($N_2SA$) $M^2/g$ | 140 | 135 |
| Surface area of the carbon black measured by cetyltrimethyl-ammonium bromide absorption (CTAB) $m^2/g$ | 135 | 128 |
| Structure measured after compression four times 24,000 psi by di-butylphthalate absorption cc/100 g | 91 | 99 |
| Yield, lb/gal. of oil charged | 3.94 | 4.59 |
| Yield, lb/gal. of oil charged adjusted to 140 $m^2/g$ $N_2SA$ | 3.94 | 4.45 |
| Yield % of total carbon, by wt. | 36.7 | 42.9 |
| Yield, % of total carbon, adjusted to 140 $m^2/g$ $N_2SA$, by wt. | 36.7 | 41 |
| Pressure drop = $p_1 - p_2$ (inch Hg) | 5 | 3 |

The results of these runs show the following. By the boundary layer interruption of this invention the yield based on the same surface area of the carbon black is increased by about 12 percent. The pressure drop is improved by more than 40 percent (considering the pressure drop in this example it is to be kept in mind that 9,262 scfh of air are introduced into the reactor in the control run whereas 10,000 scfh of air are introduced in the run in accordance with this invention); and the structure of the carbon black is increased by eight points using the radial boundary counterflow as compared to a carbon black without such a counterflow.

The following calculated example is given to illustrate the operation of a large particle size reactor shown in FIGS. 3 and 4.

EXAMPLE V

A reactor as described is employed having dimensions shown in the following:

TABLE 10

| | |
|---|---|
| Internal diameter of the reactor | 40 inches |
| Axial distance of the center of the tangential orifices from the upstream end wall | 4.5 inches |
| Diameter of the tangential orifices | 5.5 inches |
| Radial distance of the radial orifices from the longitudinal axis | 5 inches |
| Diameter of the radial orifices | 0.75 inch |
| Axial distance of the secondary air inlets from upstream end wall | 12 feet |

Into this reactor Gulf oil having a Bureau of Mines Correlation Index of 120 and an average boiling point of about 800° F. is axially introduced. Hot combustion products from combustion of a mixture of air and natural gas is radially and tangentially introduced into the reactor. Jacket air was blown through the tube 6 surrounding the oil inlet line. Secondary air 21 is fed into the reactor in radially inward direction. It is expected that the carbon black produced will have an improved and more uniform particle size distribution as compared to the carbon black produced by the same process and reactor, however, without radial counterflow. The quantities of oil and gases fed into the reactor in accordance with this example are shown in the following:

TABLE 11

| | |
|---|---|
| Oil axially through upstream end wall | 100 gph |

TABLE 11-continued

| | |
|---|---|
| Tangential air | 17 MSCFH |
| Tangential natural gas | 0.9 MSCFH |
| Radial air | 3 MSCFH |
| Radial natural gas | 0.4 MSCFH |
| Secondary air | 10 MSCFH |
| Jacket air | 5 MSCFH |

In addition to the improved qualities of the carbon black, the upwardly directed back flow of gases and the overheating of the top of the reactor caused thereby can be avoided by the radial counterflow. The back flow can also diffuse partly to the vertical wall because of the large scale turbulences existing in the reactor without the radially outwardly directed counterflow.

In the following calculated example the invention is illustrated in connection with a reactor shown in FIGS. 5 and 6.

EXAMPLE VI

The internal dimensions of the reactor employed in this example are shown in the following:

TABLE 12

| | |
|---|---|
| Axial length of precombustion chamber | 12 inches |
| Diameter of precombustion chamber | 37 inches |
| Diameter of the tangential orifices | 12 inches |
| Radial distance of the radial orifices from the longitudinal axis | 3.5 inches |
| Diameter of the radial orifices | 1.5 inches |
| Upstream diameter of the venturi reaction section | 15 inches |
| Throat diameter of the venturi reaction section | 7 inches |
| Downstream diameter of the venturi reaction section | 15 inches |
| Angle of the converging frustoconical venturi wall (upstream portion) to the axis | 15° |
| Angle of the diverging frustoconical venturi wall (downstream portion) | 8° |
| Distance of the hydrocarbon feed orifices 23 from the throat in downstream direction | 1.5 inches |
| (Obtuse) Angle of the hydrocarbon feed tubes to the longitudinal axis | 118° |

For the operation of this reactor Gulf oil having a Bureau of Mines Correlation Index of 120 and having an average boiling point of about 800° F. is axially fed through the upstream end into the reactor. The same oil is fed downstream of the throat of the venturi into the reactor. Through the tangential ports hot combustion products from burning natural gas and air are introduced, and through the eight radial tube outlets hot combustion products burning natural gas and air are introduced at an approximate radial jet speed at the orifice of 250 feet per second. The quantities of oil and gases introduced into this reactor are shown in the following:

TABLE 13

| | |
|---|---|
| Oil axially through upstream end wall | 60 gph |
| Oil downstream of the venturi throat | 140 gph |
| Tangential air | 130 MSCFH |
| Tangential natural gas | 8.5 MSCFH |
| Radial air | 20 MSCFH |
| Radial natural gas | 1.5 MSCFH |
| Jacket air | 4 MSCFH |

The pressure drop between a point within the tangential tunnel 81 close to the outlet 8 to about 15 reactor diameters downstream of the upstream end wall of the reactor without radial counterflow is 4.5 psi. The radial counterflow will reduce this pressure drop by 40 percent down to about 2.7 psi. This pressure drop is only about 0.5 psi above the pressure drop of the comparable conventional reactor with a cylindrical reaction section having 12 inch diameter.

The following is a calculated example of the operation of the reactor shown in FIGS. 7 and 8.

EXAMPLE VII

The reactor employed in this example had dimensions as shown in the following:

TABLE 14

| | |
|---|---|
| Axial length of the precombustion chamber | 12 inches |
| Diameter of the precombustion chamber | 37 inches |
| Diameter of the tangential conduits and orifices | 12 inches |
| Radial distance of the radial orifices from the longitudinal axis | 4 inches |
| Axial distance of the centers of the radial orifices from the upstream confining wall | 3 inches |
| Diameter of the radial orifices | 1 inch |

Into this reactor Gulf Oil having a Bureau of Mines Correlation Index of 120 and an average boiling point of about 800° F. is axially introduced. Natural gas and air are fed tangentially and radially inwardly into the reactor. Jacket air is fed axially surrounding the oil feed line in order to protect said line. The linear speed of the radially inwardly directed stream of combustion gases is about 700 feet per second. The quantities of gases and oil which are fed are shown in the following:

TABLE 15

| | |
|---|---|
| Oil axially fed (gph) | 260 |
| Tangential air (MSCFH) | 170 |
| Tangential natural gas (MSCFH) | 15.5 |
| Radial air (MSCFH) | 20 |
| Radial natural gas (MSCFH) | 2.7 |
| Jacket air (MSCFH) | 4 |

The introduction of stoichiometrically composed hot combustion gases into the hydrocarbon feed stream will result in a very rapid decomposition of the hydrocarbon and following this rapid first decomposition in a formation of the hydrocarbon with high structure.

Reasonable variations and modifications which will be apparent to those skilled in the art can be made in this invention without departing from the spirit or scope thereof.

I claim:

1. In a process for the production of carbon black by the pyrolytical decomposition of hydrocarbons comprising the steps
   (a) introducing hydrocarbons along the axis of a tubularly shaped longitudinal reactor having an upstream confining wall,
   (b) introducing hot combustion gases of nonstoichiometric composition tangentially into said reactor at a location close to said upstream confining wall to form a vortex of hot combustion gases spinning around the axial hydrocarbon stream,
   (c) withdrawing carbon black containing smoke from the downward end of said reactor, the improvement comprising
   (d) introducing hot combustion gases of nonstoichiometric composition opposite to the nonstoichiometric composition of the tangentially introduced hot combustion gases radially inwardly toward its longitudinal axis into the reactor from orifices located radially at a distance from the axially introduced hydrocarbon stream and located axially at a distance from said upstream confining wall and located within said vortex, the nonstoichiometric compositions of said tangentially introduced hot combustion gases as well as of said radially inwardly introduced hot combustion gases being such that said radially inwardly introduced hot combustion gases mixed with a portion of the tangentially introduced hot combustion gases form a stoichiometric hot combustion gas mixture, and (e) contacting said stoichiometric hot combustion gas mixture with said axially introduced hydrocarbon stream to effect pyrolytical decomposition thereof.

2. A process in accordance with claim 1 wherein said reactor comprises a wide precombustion chamber defined by said upstream confining wall, a cylindrical wall and a downstream confining wall arranged essentially orthogonally to said longitudinal axis, wherein said reactor further comprises in axial alignment and open communication with said precombustion chamber a narrower reaction section, wherein the hydrocarbons are introduced axially through said upstream confining wall, wherein the combustion gases in step (b) are tangentially introduced through said cylindrical wall and wherein the combustion gases in step (d) are introduced through a plurality of individual axial conduits extending axially through the upstream confining wall and ending turned 90 degrees within the reactor from the axial direction toward the longitudinal axis and being arranged symmetrically around the longitudinal axis, the ends of said conduits facing radially inwardly toward the axis.

3. A process in accordance with claim 1 wherein the radially inwardly introduced hot combustion gas stream is introduced in such a manner as to flow into the axial hydrocarbon stream, but not radially out of this stream.

4. A carbon black reactor comprising:

(a) a housing with tubular-shaped interior from heat resistant material having an upstream confining wall arranged essentially orthogonally to the longitudinal axis of the reactor, (b) first conduit means for axial introduction of hydrocarbon feed into said housing, said first conduit means being arranged extending axially through said upstream confining wall, (c) a cylindrical portion of said housing attached to said upstream confining wall, (d) second conduit means for tangential introduction of combustion gases into said housing, said second conduit means being arranged extending tangentially through said cylindrical portion of the housing close to said confining wall, (e) third conduit means for radially inward introduction of a gas into said housing, said third conduit means comprising a plurality of conduits extending into the interior of the reactor and ending in openings facing the stream of axially introduced hydrocarbon feed, said conduits extending axially through said confining wall and end turned 90° from the axial direction toward the radial direction, (f) means to withdraw the carbon black smoke from the downstream end of the reactor.

5. A reactor in accordance with claim 4 which comprises a precombustion section defined by said upstream confining wall, said cylindrical wall and a downstream confining wall arranged essentially orthogonally to the longitudinal axis of the reactor, and in axial alignment and open communication with said precombustion section a reaction section of smaller diameter than the cylindrical wall of the precombustion section.

6. A reactor in accordance with claim 5 wherein the reaction section is confined by a wall having a cylindrically shaped interior.

7. A reactor in accordance with claim 5 wherein the reaction section is defined by a wall having a venturi-shaped interior.

8. A reactor in accordance with claim 5 Which comprises a totally cylindrically shaped combined precombustion and reaction section connected to said upstream confining wall.

9. A reactor in accordance with claim 4 wherein:

(a) said housing comprises an upstream confining wall arranged essentially orthogonally to the longitudinal axis, (b) said first conduit means are arranged axially extending through said upstream confining wall, (c) said upstream confining wall is attached to a cylindrical portion of the housing, (d) said second conduit means are arranged extending tangentially through said cylindrical portion of the housing close to said upstream confining wall, (e) said third conduit means comprises a plurality of individual tubes extending axially through said confining wall and being bent by 90 degrees toward the axis of the reactor to form orifices facing radially inwardly and being located at a radial distance from the hydrocarbon feed stream and at an axial distance from the upstream confining wall, (f) said second conduit means are connected to a first source of fuel and oxygen in nonstoichiometric composition, and (g) said third conduit means are connected to a second source of fuel and oxygen in nonstoichiometric composition opposite to the first source.

* * * * *